Aug. 31, 1926.

C. C. BALDWIN

1,598,234

AUTOMATICALLY OPERATING POWER ACTUATED COMBINED GRAIN CUTTING AND
THRASHING HARVESTER

Filed Oct. 18, 1920   6 Sheets-Sheet 2

Inventor:
By Curtis C. Baldwin
H. S. Bailey.   Attorney

Aug. 31, 1926. 1,598,234
C. C. BALDWIN
AUTOMATICALLY OPERATING POWER ACTUATED COMBINED GRAIN CUTTING AND
THRASHING HARVESTER
Filed Oct. 18, 1920    6 Sheets-Sheet 4

Aug. 31, 1926. 1,598,234
C. C. BALDWIN
AUTOMATICALLY OPERATING POWER ACTUATED COMBINED GRAIN CUTTING AND
THRASHING HARVESTER
Filed Oct. 18, 1920 6 Sheets-Sheet 5

Inventor
By Curtis C. Baldwin
H. S. Bailey, Attorney.

Aug. 31, 1926.

C. C. BALDWIN 1,598,234

AUTOMATICALLY OPERATING POWER ACTUATED COMBINED GRAIN CUTTING AND
THRASHING HARVESTER
Filed Oct. 18, 1920

Inventor:
By Curtis C. Baldwin.
H. S. Bailey Attorney.

Patented Aug. 31, 1926.

1,598,234

UNITED STATES PATENT OFFICE.

CURTIS C. BALDWIN, OF DENVER, COLORADO, ASSIGNOR, BY MESNE ASSIGNMENTS, TO ADVANCE RUMELY COMPANY, OF LA PORTE, INDIANA, A CORPORATION OF INDIANA.

AUTOMATICALLY-OPERATING POWER-ACTUATED COMBINED GRAIN CUTTING AND THRASHING HARVESTER.

Application filed October 18, 1920. Serial No. 417,644.

My invention relates to an automatically operating power actuated combined grain cutting and thrashing harvester.

And the objects of my invention are:

First. To provide a combined power propelled and operated harvester, in which the grain cutting and thrashing mechanism and the power propelling and operating mechanism form a single cooperatingly connected and integrally constructed grain harvesting unit.

Second. To provide a grain harvester in which the grain cutting and thrashing mechanism is cooperatively combined and constructed with and operated and propelled by a tractor, having mechanism connected with and in continuous operative relation to the grain cutting and thrashing mechanism.

Third. To provide a combined and operative grain cutting and thrashing mechanism, traction mechanism and engine tractor that are so cooperatively connected together that they form an integrally constructed single unit harvester, certain parts of each of which are so united that power driven parts of the traction engine are operatively connected to the operative members of the harvesting mechanism and operate the same, but in which the said traction engine can be separated from the grain cutting and thrashing mechanism and used as an individual tractor for all work that a tractor can perform.

Fourth. To provide a grain cutting and conveying mechanism in which the head portions of the grain are cut and conveyed from the opposite ends of the sickle to the center of the length of the sickle, and are then conveyed to the thrashing mechanism.

Fifth. To provide means for thrashing, for winnowing, and for screening grain and for discharging the screened grain into a wagon or truck secured to and moving with the harvester, and for retreating the middlings product of the grain.

Sixth. To provide means for operating the grain cutting mechanism and the thrashing mechanism independently of the controlling and propelling mechanism of the tractor portion of the harvester.

Seventh. To provide means for supporting the grain cutting and thrashing mechanism and the front end of the tractor on the same axle and on one pair of supporting and steering wheels whereby they are securely connected together in fixed operative relation to each other, but in such a manner that each has independent and individual freedom to accommodate itself to the horizontal, transverse and torsional strains of uneven ground; and Eighth. To provide an automatically operating combined grain cutting, harvesting, winnowing, screening and middlings retreating grain thrashing harvester in one single automatically operating and self-power operated and propelled grain harvester.

I attain these objects by the mechanism illustrated in the accompanying drawings, in which:

Fig. 7 is a vertical, longitudinal, sectional view of Figure 6 with a fragmentary section substantially in a plane represented by line 7—7 in Fig. 1 of the drawings.

Fig. 8 is a plan view of the crank-operated rakes which discharge the thrashed straw from the straw box.

Similar letters of reference refer to similar parts throughout the several views.

My present invention appertains and embodies in itself one integrally constructed machine that cuts the grain, thrashes and winnows and screens it, and discharges the separated clean grains of wheat, oats, barley and other grains, and of beans and similar foods, into a wagon or a truck secured to and moving with it, and which may be operated and propelled under the control of but one operator.

The thrashing, winnowing, screening and the thrashed grain discharging mechanism of my invention is attached to, combined with, and is operated and propelled by a tractor that is cooperatively built into and forms an integral and cooperating part of the harvesting mechanism.

Figures 3, 11:
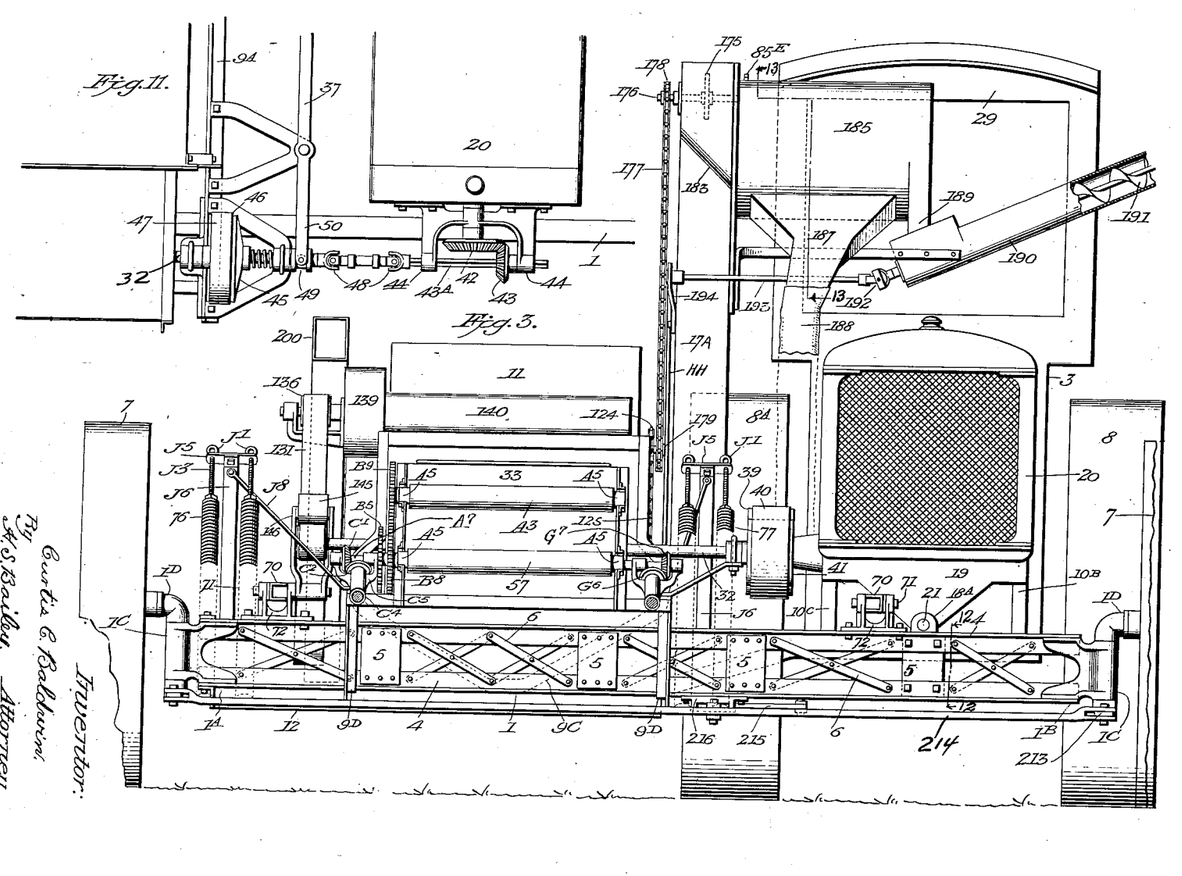
Fig. 3 is a front view of the machine, the platform which supports the sickle bar and the endless conveyors, which receive the cut wheat, being omitted.
Fig. 11 is a plan view of a part of the front end portion of the machine, showing a modification in the manner of driving the thrashing cylinder from the tractor.
Figures 4, 19:
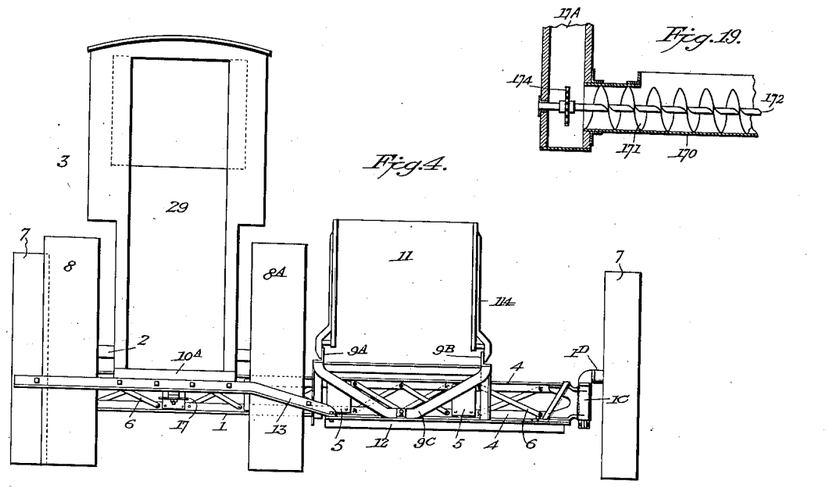
Fig. 4 is a rear view of the machine, showing more particularly the manner of supporting the rear end of the thrashing and separating unit of the machine.
Fig. 19 is a fragmental sectional view substantially in planes represented by line 19—19 in Fig. 6 of the drawings and showing the screw conveyor and elevator housing connected therewith, which receive the screened wheat from the riddle box.
Figures 5, 12, 21:
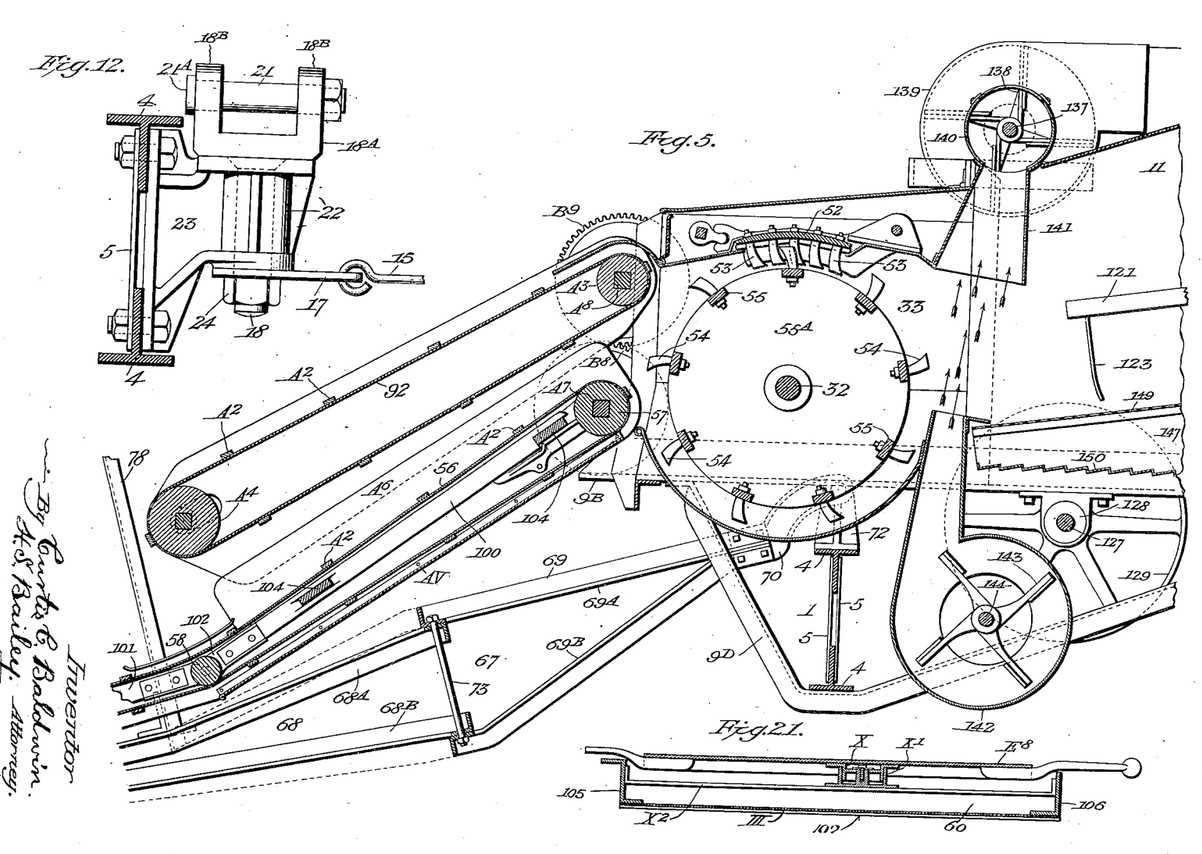
Fig. 5 is a sectional view in a plane represented by line 5—5 of the drawings—slightly enlarged—of the front end portion of the thrashing unit of the machine, and also showing the endless conveyors which carry the wheat heads to the thrashing cylinder, and the manner of supporting the platform.
Fig. 12 is a vertical, sectional view substantially in a plane represented by line 12—12 in Fig. 3 of the drawings, and through the main axle, showing the means by which the front end of the tractor is connected with the said main axle.
Fig. 21 is a transverse, sectional view through the platform and substantially in a plane represented by line 21—21 in Fig. 1 of the drawings, showing the oscillated lever which reciprocates the cutter bar.

The main axle 1 supports and forms a part of the chassis of the harvester and it is the only axle the harvester has except the traction wheel supporting axle 2, at the rear end portion of the tractor 3. This main axle 1 may consist of a single piece of structural iron bar or beam such as an I beam or a channel beam. I preferably, however, construct this axle 1 of T iron bars 4, plates 5 and straps 6, which are assembled and riveted together into a trussed and latticed form of an axle, as illustrated in Fig. 3, as this construction provides an axle of great strength and at the same time one that contains a sufficient degree of resiliency to enable the grain harvesting, as well as the entire front end portion of the traction engine portion of the harvester, to ride easily and with a slight resilient movement, over rough ground, without severe jolting movements, and it prevents crystallizing of the axle itself and also of other parts of the mechanism of the entire harvester.

To the opposite ends 1^A and 1^B of the axle 1, I secure yokes 1^C, that are provided with pivotally mounted axles 1^D upon which I mount wheels 7 which preferably have wide, smooth, flat ground treading tire members. The axles of these wheels 7 are preferably provided with roller bearings.

These ground treading wheels 7 support the entire weight of the grain cutting, conveying, thrashing and discharging machinery, as well as the entire weight of the front end of the traction engine, and they also act as the steering wheels of the harvester, and they are rollingly moved over the ground by the rear ground gripping wheels 8 and 8^A of the traction engine part 3, of my harvester.

The chassis of the harvester may be constructed of any kind of structural iron bars, but I preferably use angle-iron bars for all of it except the axle 1. The chassis of the harvester contains two frame members 9 and 10. The frame member 9 consists of the individual bars 9^A and 9^B, which are positioned parallel to each other and extend at right angles to the axle and throughout the greater part of their length these extend to the rear of it, but they also extend over the top of and a short distance beyond the axle 1, and they are positioned at equal distances from the center line A of the thrashing mechanism, and their rear ends are connected together by a cross bar 9^C. This frame 9 is secured to the axle by straps 9^D, that are secured to its side bars, and which are bent downwardly and extend under and are bolted or otherwise secured to the lower edge of the axle 1.

The housing box 11 which contains the thrashing mechanism, rests on and is secured to this frame 9.

To the end portion 1^A of the axle, one end of a brace bar 12 is bolted, which extends diagonally across the center of the rear end cross bar 9^C to which it is bolted or otherwise secured, and it extends beyond this cross bar to and is bolted to a cross bar 13 that forms the rear end member of the chassis and which extends across the traction engine member and beyond its outside traction wheel 8.

This rear end cross bar 13 is bolted to the rear end cross bar 10^A of the traction engine supporting frame 10, which consists of the side bars 10^B and 10^C. These side bars 10^B and 10^C are arranged parallel to each other at equal distances from the center line B of the tractor, and they are provided with a front end cross bar 10^D, and this tractor frame 10 extends from the rear end cross bar 13 to and is detachably connected to the axle 1, as will be presently explained.

Near the ends of the cross bar 13 are removably secured the ends 14 of two truss rods 15 which extend along the tractor and outside of the traction wheels 8, 8^A and which pass through a spacing bar 16 mounted on the frame 10 and in front of said wheels. The rods 15 extend from the ends of the spacing bar 16 to and are connected to the opposite sides of a plate 17, that is secured to the lower end of the pivotal or king pin 18 that connects the front end of the tractor to the axle.

The front end of the tractor is pivotally connected to the axle 1 by means of a combined horizontal and a vertical pivotal pin coupling. This coupling connection comprises a plate 19 that is secured to the frame of the tractor underneath the radiator 20 and depends therefrom, and its lower end is pivotally connected by a horizontal pin 21 to the upper and head end 18^A of the vertical pin 18 which is preferably made as follows: The head end 18^A of the vertical pin 18 is provided with a central slot into which the lower end of the plate 19 extends, and the horizontal pin 21 which is provided with a head portion 21^A extends pivotally through the sides 18^B of the head 18^A of the pin 18 and through the lower end of the plate, and is provided with a hole to receive it, which is threaded on the projecting end and a nut is threaded on the projecting end of this horizontal pin to prevent its accidental displacement from the pin 18 and the plate 19.

The pin 18 is the pivotal or king pin that connects the front end of the tractor to the axle 1 and it extends vertically down through a sleeve portion 22 that forms a part of a bracket 23 that is secured to the adjacent side of the axle 1.

The plate 17 to which the truss rods 15 are secured, is placed on the lower end of this vertical pin 18, which projects below the sleeve portion of the bracket and extends through an aperture made in the plate to receive it, and a nut 24 is threaded to the terminal end of the vertical pin below the plate 17 to prevent displacement of the plate 17, from the pin, as well as to secure the pin to the sleeve of the bracket.

A brace bar 25 is bolted at one end to the outer end portion 1^D of the axle and it extends diagonally to the adjacent side bar 10^B of the frame of the tractor, and is bolted to it at the middle portion of its length.

The entire grain cutting and thrashing mechanism, as well as the power operating and propelling mechanism of my harvester, consequently rests on, and is operatively supported by and secured to this integrally constructed and cooperatively united chassis that is formed of the axles 1 and 2, and the frames 9 and 10, and their trussing and bracing bars and rods, and the front supporting and steering and the rear traction wheels.

My combined grain cutting and thrashing harvester invention contemplates broadly the use, as the operating and propelling power of it, of any of the tractors at present in use; often such tractors have had such mechanical features added to them and such changes made in them as will enable them to be operatively and integrally combined and connected to the grain cutting and thrashing and other mechanism of my harvester.

I have, however, preferably designed and use a special form and type of power transmitting and propelling tractor for my harvester that is much better adapted to enable it to accomplish all of the requirements and objects and uses for which I have invented it, than any of the tractors in use, and I have so combined and arranged it that it forms a continuous connection with the complete mechanism of my harvester, and which I have so connected with the grain cutting and thrashing elements of it that the completed harvester represents in itself a substantially single monolithic unit form and type of a harvesting machine, but which, however, is so constructed and assembled that after the grain harvesting period of the year is over, can be separated so that the traction engine portion of it can be used as a tractor for all work a tractor can perform through the rest of each year.

The especially designed tractor part of my harvester consists of the supporting frame 10 and its traction wheels 8 and 8^A which are connected to the axle 1 and the rest of the chassis of the harvester, as above described, and a platform or floor on which a cab 29 is constructed.

On the platform 10 of the tractor, I place a power developing engine 30, of any suitable type, but preferably of the internal combustion type, the crank shaft 31 of which extends longitudinally along the frame or platform 10 and is operatively arranged and provided with suitable mechanism, including the hand operating, controlling levers, to turn the front supporting and steering wheels and to rotatively drive the ground gripping traction wheels, which mechanism I do not illustrate, as it is used on all tractors.

The crank shaft 31 of the tractor transmission is used to rotatively drive the shaft 32 of the thrashing cylinder 33, in which it is mounted. This shaft 32 is rotatably mounted in bearings 34 secured to the opposite sides of the housing box 11, and is operatively connected to the crank shaft 31 of the engine.

My invention contemplates any means for directly or indirectly driving the thrashing cylinder or any of the mechanism of the thrashing and grain cutting mechanism of the harvester from the crank shaft 31, and I preferably carry out this feature of my invention by the following instrumentalities:

Upon the rear end portion 35 of the crank shaft 31, I secure a bevel gear 35^A, which meshes with and rotates a bevel pinion 36, which is secured on one end of a shaft 38, that is rotatively mounted in bearings that are secured to the tractor. This shaft 38 extends at right angles to the crank shaft beyond the inside of the tractor, and on its outer end I secure a belt pulley 39. This belt pulley 39 is connected by a belt 40 to a pulley 41 that is secured on the outer end of the driving shaft 32 of the thrashing cylinder 33. I may, however, employ, instead of belt transmission mechanism, the following means and method of connecting the crank shaft with, and of transmitting its rotative power to, the shaft 32 of the thrashing cylinder. Upon the front end portion of the crank shaft, which, with either arrangement for driving the thrashing cylinder, is made long enough at its ends to support the bevel gears, I secure a bevel gear 42 with which a bevel pinion 43 meshes, and which is secured on one end of a shaft 43^A that is rotatably journaled in boxes 44 that are secured to the tractor, and on the opposite end of this shaft 43^A one part 45, of a clutch coupling 46 is slidingly secured, while the opposite part 47 of this clutch coupling is secured on the end of the shaft 32 of the thrashing cylinder 33. The shaft 43^A is preferably divided intermittently of its ends and universal joints 48 are inserted in it. The part 45 of the clutch coupling 46 is provided with a neck recess 49 and receives a yoke-shaped end 50 of a shifting lever 37 which is supported upon and connected to a bracket on the bar 9^A. The lever 37 is intended to extend to within reach of the operator in the cab of the tractor, which enables the operator to actuate this clutch to start and run the thrashing cylinder or to stop it independently of the hand lever and other mechanism that controls the tractor's movements in propelling the harvester over the ground.

The whole of the front end portion of the tractor rests on and is supported and carried by the axle 1 and its pivotal connection on the horizontal pin allows the axle and also the front end of the tractor to tiltingly adjust themselves to any unevenness of the ground, while the axle can turn slightly on the vertical pin when steering the harvester around corners.

The top part of the housing box 11 is provided with a concave plate 52 that is pivotally hinged to it, the under side of which is provided with depending thrashing blades 53 that extend down between similar thrashing blades 54, that are secured at short distances apart, on bars 55 that are secured to the edges of spaced disks 55^A which are rigidly mounted on the shaft 32. Upon the front end of the thrashing cylinder is positioned the upper end portion of an endless traveling belt 56 which is mounted on the rollers 57, 58 and 59, and which is rotatively journaled to support the belt operatively, as will be presently described.

This endless traveling belt 56 extends downwardly and forwardly from the thrashing cylinder to the front edge portion and also to the center portion of a grain receiving and belt supporting and grain conveying platform 60 that extends transversely across the front end of the harvester parallel with its axle 1.

Two endless traveling belts 61 and 62 are mounted on this platform on rollers 63 and 64 that are rotatively journaled in the platform parallel with the center belt 56, and these belts extend lengthwise of the platform and from its opposite outside edge portions to the center endless belt 56.

The two belts 61 and 62 of the platform 60 receive the grain that is engaged and bent over them by the blades B of the reel R, and that falls onto them when it is cut by the knives 65 of the sickle bar 66, and conveys it to and delivers it onto the center belt 56 which conveys it to and delivers it onto the thrashing blades of the thrashing cylinder.

The mechanism that operates these cut grain conveying belts and that rotates the reel and that reciprocates the knife bar of the sickle will be presently explained.

The platform 60 is supported by a trussed frame 67 that consists of two independently but firmly trussed angle bar arms 68 and 69. The arm 68 is formed by two angle iron bars 68$^A$, 68$^B$ which are secured together at their opposite ends and which incline downwardly from their inner to their outer or forward ends. The upper bar 68$^A$ is substantially straight from its inner end to the platform 60 but the inner end of the lower bar 68$^B$ is bent downwardly for about one third of its length to provide a truss member for the upper bar 68$^A$.

The construction of the arm 69 is the same as that of the arm 68, just described, except that both of its bars 69$^A$ and 69$^B$ are spread apart to allow the arm 68 to pass between them. The inner ends of these trussed arms 68 and 69 are rigidly secured to the ends of short curved arms 70, the opposite ends of which are pivotally secured by a removable bolt 71 between the divided ends of a pair of brackets 72 that are secured to the top of the axle 1. These trussed arms 68 and 69 extend diagonally across each other and are secured to each other by a vertically positioned bolt 73 and their outer ends extend diagonally under the platform and are secured to the underside of its opposite end portions. There are two bars 74 which brace the arms 68 and 69 with respect to the axle 1. The left hand bar 74 is secured at its inner end to the pivoted curved arm 70 on the inner end of the arm 68, and at its outer end to the outer portion of the arm 69; the right hand bar 74 being secured at its inner end to the pivoted curved arm 70 on the inner end of the arm 69, and at its outer end to the outer portion of the arm 68. The platform is also supported by two pairs of coiled springs 76 and 77, which will be explained hereinafter.

The platform 60 is provided with two rear edge side boards 78 that project upward from its rear edge and which prevent the cut grain from moving off from the rear side of the platform. These side boards consist of sheets of canvas that are secured to a wooden frame 79 which is secured to metal standards 7$^x$ that are secured to the corners of the platform and also to the rear edge of the platform at the opposite sides of the endless belt that conveys the grain up to the thrashing cylinder.

The grain engaging reel R consists of a shaft 80 that is journaled in bearing brackets 81 that are secured to metal arms 82 that extend from the corner standards 7$^x$ of the platform and which are supported intermediate of their lengths by strut bars 83, the lower ends of which are secured to the end edge of the frame 84 of the platform. On the shaft 80, hubs 85 are secured, from which spokes 86 radiate, and to the ends of which the flat, thin, wide blades B are secured that are arranged and adapted to rotate in a direction to sweep the head portion of the grain over the top of the platform, so that it will fall on the top of the endless belt conveyors of the platform and be conveyed by them to the thrashing cylinder.

One end of the reel shaft 80 is rotatively journaled in the hub portion 88, of a yoke 89, that is secured to the top of the adjacent arm 82, and a bevel gear 90 is secured on the terminal end of the shaft 80, which projects through the hub of the yoke.

The ends 91 of the yoke surround the opposite sides of and project beyond the bevel gear 90, and are provided with revoluble bearing sleeves that have square, axial apertures through them, through which one end of a square shaft 87 extends, which, intermediate of its ends, is provided with a universal joint 93.

A beveled pinion 94 is mounted on this square shaft between the ends of the yoke, which meshes with and rotates the bevel gear 90, and consequently the shaft 80, and the reel.

The inner end portion of this square shaft 87 is journaled in a bearing 95 that is secured to the adjacent end standard 7$^x$ of the platform, and a sprocket wheel 96, that is secured to the end of shaft 87 is connected by a sprocket chain 97 to a sprocket wheel 98 that is secured on a shaft 99 that is rotated by mechanism that will be presently described, the shaft 99 forming part of the shaft of the adjacent roller 64, over which the inner end of the left hand platform belt turns.

A few inches above the grain conveying center belt 56, I place an endless conveying belt 92 that is of the same width as the belt 56 and its inner end extends from the upper portion of the adjacent side of the thrashing cylinder over the top surface of the belt 56 and in longitudinal alinement with it to close to the rear side boards 78 of the platform 60.

This endless belt 92 extends at a downward angle from the thrashing cylinder 33 but at a sufficiently less downward angle than the center belt 56 to form a wide grain entering space between it and the top surface of the center belt 56 and a continuously smaller tapering space is formed between these belts to the thrashing cylinder.

The surfaces of both of these belts are provided with flights A² and they are so relatively and cooperatively arranged that they feed the grain by a forcible travelling pressure feeding movement directly into the thrashing blades of the thrashing cylinder. This belt 92 is mounted on rollers A³ and A⁴ that are journaled in bearings A⁵ which are secured to the side plates A⁶ that support the shafts A⁷ and A⁸ of the rollers 57 and A³, which shafts are preferably square shafts.

Figures 1, 9, 10:
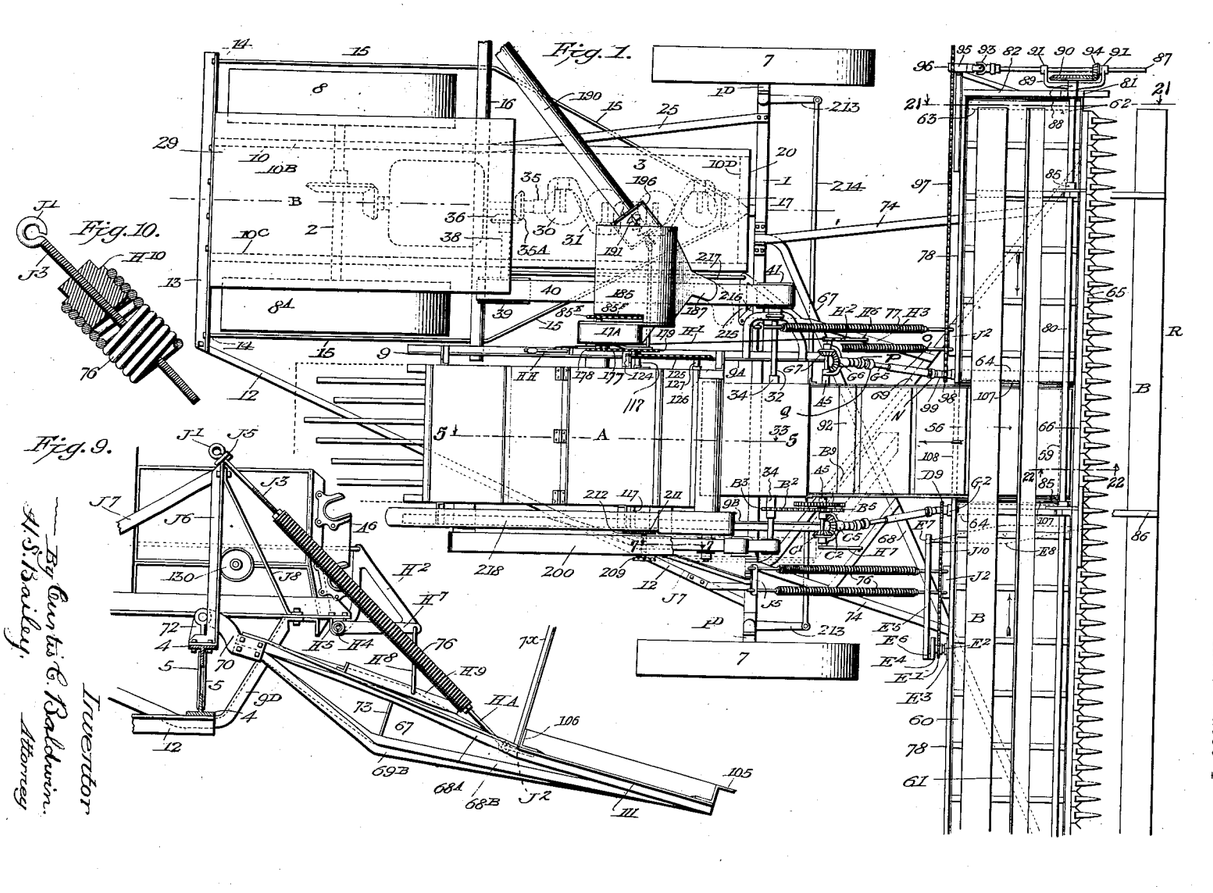
Figure 1 is a plan view of the improved harvesting machine.
Fig. 9 is a side view of the forward portion of the thrasher, showing more particularly the trussed arms which carry the platform, together with the tension springs which assist in supporting and lifting the said platform.
Fig. 10 is an enlarged sectional view of the upper end of one of the tension springs shown in Figure 9.
Figures 2, 13, 14, 15, 16, 17, 18:
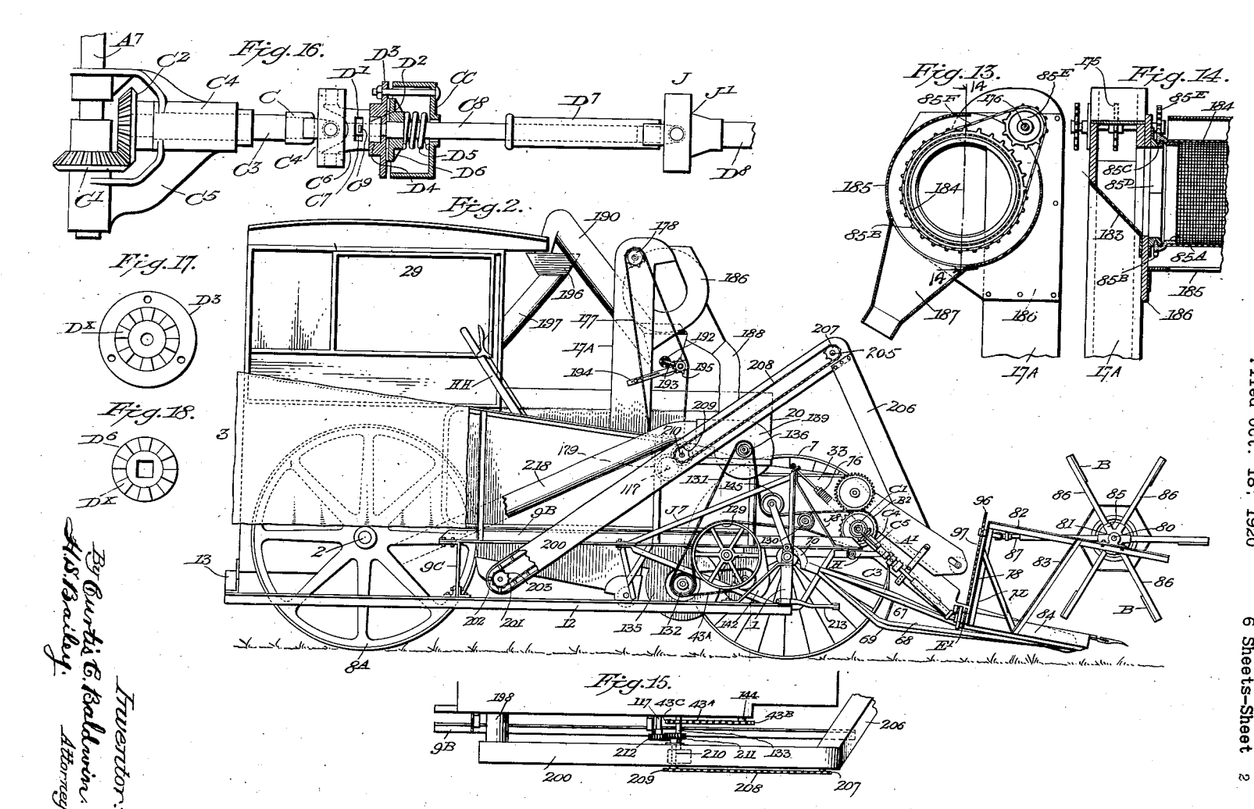
Fig. 2 is a side elevation thereof.
Fig. 13 is a transverse, sectional view of the revolving screen and its casing substantially in planes represented by line 13—13 in Fig. 3 of the drawings, by which the final screening operation is imparted to the wheat before it is discharged from the machine.
Fig. 14 is a longitudinal sectional view substantially in a plane represented by line 14—14 in Figure 13, showing more particularly the manner of supporting the said screen.
Fig. 15 is a plan view of a portion of that side of the thrasher shown in Figure 2, and illustrating more particularly the manner by which rotation is imparted to the tailings elevator.
Fig. 16 is a plan view, partly in section, of the extensible tumbler shafts by which rotation is imparted to the horizontal endless conveyors of the platform.
Figs. 17 and 18 are face views of spring-controlled locking members by which the two sections of the tumbler shaft are made to turn in unison under normal torsional stress, but which permits one section to turn while the other is stationary.

The outer end of this belt 92 is vertically adjustable to increase or diminish the width of the grain entering space between it and the main belt 56 below it, by means of the device A¹ which is arranged to raise and lower the outer end of this belt, as shown in Figure 2.

A continuous travelling movement is imparted to these two belts, which moves their opposing grain engaging surfaces at the same travelling speed, by means of a sprocket chain B² that is mounted on a sprocket wheel B³ that is secured on the outside end portion of the supporting shaft 32 of the thrashing cylinder 33 which extends beyond its adjacent journal box and beyond the housing box 11 far enough to allow this sprocket wheel B³ to be secured to it.

The sprocket chain B² passes around a sprocket wheel B⁵ that is secured on the end of the shaft A⁷ of the roller 57 that supports the upper end of the center belt 56, and thus a travelling movement is imparted to this center belt 56.

On the shaft A⁷ of this roller 57, a spur gear B⁸ is secured, which meshes with a spur gear B⁹ of the same diameter that is secured on the shaft A⁸ of the upper roller A³, that supports the upper or inner end of the belt 92. Consequently the opposing surfaces of these two endless belts between which the grain is fed into the thrashing cylinder, run at the same speed, and consequently in unison with each other, so that their flights A² imbed themselves at the same time on opposite sides of the grain into it and force it forward into the thrashing blades of the thrashing cylinder 33, thus providing a positive feed from the platform 60 into the thrashing cylinder.

A bevel gear C¹ which is secured on the shaft A⁷ of the roller 57 meshes with a bevel gear C² which is secured on one end of a shaft C³ that extends revolubly through a hub portion C⁴ of a yoke C⁵, the ends of which are loosely mounted on the shaft A⁷ on opposite sides of the bevel gear C².

The opposite end of the shaft C³ is threadedly connected to a pivoted sleeve C that forms one-half of a universal joint C⁴, the opposite half of which is provided with a hub portion C⁶ that is secured on a reduced round end portion C⁷ of a square shaft C⁸, and is secured in the hub C⁶ by a pin C⁹ that passes through a seat D¹ in the hub C⁶ and through an aperture in the said end portion C⁷.

The end of the hub C⁶ has a square terminal end portion D² that fits into a square recess D⁴, that is formed in the hub portion of a flange D³ that is loosely mounted on the round end C⁷ of the square shaft C⁸, and bears against the shoulder formed between the reduced round end portion C⁷ and the full size end of the square shaft.

This flange D³ is bolted to and forms a part of a resiliently yielding box CC that fits very loosely on the shaft C⁸ and that surrounds a spring D⁵ that is placed under tension between its inner end and a plate D⁶ that is held by the spring against the flange D³.

The opposing faces of the buffer plate D⁶ and the flange D³ are provided with intermeshing inclined serrations DX that fit into each other and are normally held in and against each other as the spring pushes the buffer plate against the flange, and it also, by pushing against the box, holds the flange against the shoulder on the shaft.

This arrangement allows the clutch box to turn on the serrated face of the plate D⁶ when for any reason the knife of the sickle which is operated by the square shaft and other cooperating mechanism gets clogged and stops, which would stop this square shaft and the serrated clutch plate D⁶ while the clutch flange D³ would still continue to be rotatively driven by the traction engine, and would, with the universal joint portion that is connected to it, continue to rotate on the round end of this square shaft.

A sliding sleeve D⁷ on the outer end of this square shaft makes of it a variable length or compensating movement shaft that shortens or lengthens as the platform is raised or lowered to cut short or tall grain.

The square shaft C⁸ extends beyond the clutch box CC, and into a square passage formed in the sleeve D⁷ in which passage the said shaft is slidably mounted.

The outer end of the sleeve is provided with the one-half pivoting part of a universal joint J which connects with the opposite half part J¹ of the universal joint the hub of which is threaded onto the end of a shaft D⁸ on which a sprocket wheel D⁹ is secured.

A sprocket chain J¹⁰ extends from this sprocket wheel D⁹ to a sprocket wheel E¹ which is mounted on a short stub shaft E² that is secured to the adjacent rear edge portion of the frame of the platform 60 by a flange E³.

A crank disk E⁴ is rotatably mounted on the outer end of this stub shaft and is secured to the sprocket wheel, and one end of a connecting rod $E^5$ is secured on the pin $E^6$ of the crank pin disc, and its opposite end extends along the rear edge portion of the frame of the platform 60 and is pivotally connected by a ball and socket joint $E^7$ to one end of a rock arm $E^8$, the socket portion being connected to the connecting rod and the ball part of this joint being formed on the end of the rock arm.

The rock arm $E^8$ extends across the platform 60 and is provided about the middle of its length with a pivot member X which fits in a bearing socket $X^1$ on a cross bar $X^2$ which is secured to the angle bars 105 and 106, and its outer terminal end extends between a pair of rollers $F^2$ that are pivotally secured in a recess $F^3$ that is formed in a block $F^4$ that is secured to the sickle bar 66, at the center of its length, which is preferably sixteen feet.

The knives 65 are removably secured to the sickle bar 66, which has a reciprocating movement in a slideway formed in a finger bar $F^8$ having guard fingers $F^9$, which extend over the knives in the usual manner.

The frame of the platform 60 is preferably made of angle iron bars and is of rectangular shape and the shaft $D^8$ is provided with a journal box $G^2$ that is secured to the rear side of this frame close to the sprocket wheel $D^9$.

This shaft extends across the platform and is supported in a journal box secured to the front side of the frame of the platform, and the inner roller of the platform's lengthwise endless grain conveying belt 61 is mounted on this shaft which imparts a traveling movement to its upper surface from close to its end towards and to the center endless belt 56.

The inner roller of the endless grain conveying belt 62, on the opposite side of the center belt 56 from the belt 61, is also mounted on a shaft 99 that is supported in journal boxes that are secured to the frame of the platform.

The inner end of this shaft 99 carries the sprocket wheel 98 from which power is transmitted to the sprocket chain 97 to rotate the reel R of the platform, as before described, and the inner end of the said shaft 99 is also connected by a universal joint N, and a sleeve O, with a square shaft $G^5$, which has a sliding connection with the sleeve O, and which is provided with a universal joint P, a buffer box Q, and a bevel gear $G^6$, all of which are similar in construction and arrangement to the corresponding mechanisms described in connection with the square shaft $C^3$, positioned on the opposite side of the conveyor 56 from the square shaft $G^5$.

The bevel gear $G^6$ meshes with a bevel gear $G^7$ that is secured on the opposite end of the shaft $A^7$ of the roller 57.

The plates $A^6$ that extend above the opposite sides of the center belt 56 and are supported at their upper ends on the shaft $A^7$ of the roller 57 are connected at their lower edges to a bottom plate AV that extends across the underside of the center belt 56, and the lower end of this bottom plate extends about to the platform frame.

To the side plates $A^6$ are secured bearing members for the rollers 57, 58 and 59, which bearing members are each made up of bars 100 and 101, the inner ends of which are secured to an intermediate connecting member 102. The bars 100 have bearings which support the upper roller 57; the intermediate member 102 supports the intermediate roller 58, and the lower roller 59 is supported in slots in the ends of the bars 101. These side bars are held parallel, and at the proper distance apart, by spacing bars 104, the ends of which rest in recesses in the said side bars.

The front member of the platform frame comprises a Z-bar 105 which extends the full length of the platform; the rear members 106 of the frame are angle bars which extend from the outer ends of the frame to the side plates of the middle conveyor 56, and the ends of these rear bars are connected to the front bar 105 by bars 107, and the inner ends of the bars 106 are connected by a bar 108 which is bent downward to lie beneath the forward portion of the frame of the conveyor 56 which lies between the bars 107. The forward end of the frame of the conveyor 56 lies below the level of the underside of the platform frame and rests upon curved metal slideway strips 109 which are secured at their outer ends to the Z-bar 105 which supports a bottom plate 110. The platform frame has bottom plates 111 which extend from the bars 107 to the outer end of the frame. As the frame of the conveyor 56 and the platform frame swing from different points the forward end of the said conveyor frame moves towards the Z-bar 105 as the platform is raised from its lowermost position to its highest point from the ground and the slideway strips 109 thus support the free end of the said conveyor frame in all adjustments of the platform.

The platform 60, that receives the grain as it is cut by the sickle, is arranged to be raised up bodily with its reel off the ground and to be held in any desired position up to about a foot above the ground by a lever mechanism that extends from the platform to the cab of the tractor part of the harvester and which consists of a hand operating lever HH that is positioned within reach of the driver of the harvester from his operating position in the cab, which hand lever is provided with the usual ratchet locking mechanism.

To an intermediate portion of this lever is pivotally connected one end of a rod H¹, and the opposite end of the latter is pivotally connected to the top end of a triangular rock arm H², the vertical leg of which is secured on a shaft H⁴ that is supported in brackets H⁵ that are secured to the frame 9 on which the housing box 11 rests; the outer end of the rock arm is pivotally connected to one end of a rod H⁶ that depends from it and is connected to a bar H³ which is bolted to the members 68 and 69 of the trussed frame 67 that supports the platform. There is also an arm H⁷ that is secured on the opposite end of the shaft H⁴, the outer end of which is secured to a depending rod H⁸ that is secured to a bar H⁹ which is bolted to the trussed frame 67.

Consequently the driver of the harvester can raise or lower the platform to cut short or tall grain as close to its heads as desired, and the raising of the platform by the lever mechanism operated by the driver in the cab of the tractor is assisted by means of the two pairs of coiled tension springs 76 and 77, heretofore mentioned.

The springs of each of these two pairs of springs are placed side by side and close together. These springs are placed in an inclined position, and each of the ends of each coiled spring has a square ended plug H¹⁰ secured to it by being threaded into its end coils. The lower plugs are provided with a rod HA that has a hook end that hooks into an aperture formed in a plate J² that is secured to the underside of the rear side bar of the frame of the platform 60. A long rod J³, that has a ring J¹ formed at its upper end, is threaded from near the ring J¹ throughout its length through each upper plug and extends down into each spring a sufficient portion of its length to allow for the adjustment of the springs to support the platform 60.

These rods J³ extend through plates J⁵, that are made wide enough to support both rods of each pair of springs, and the rings J¹ of the rod rest on top of the plate J⁵ which is secured to the upper end of a vertical angle bar J⁶ that is secured to the top of the axle 1. This vertical bar is braced by two struts J⁷ and J⁸, that are secured to the parts of the chassis of the harvester. The tension of the springs is adjusted to take the weight of the platform by turning the threaded rod J³ in the plugs.

The housing box 11 extends rearwardly of the thrashing cylinder far enough to cover and support the winnowing and screening and middlings returning apparatus and the thrashed straw discharging apparatus, which will now be described.

Figure 6:
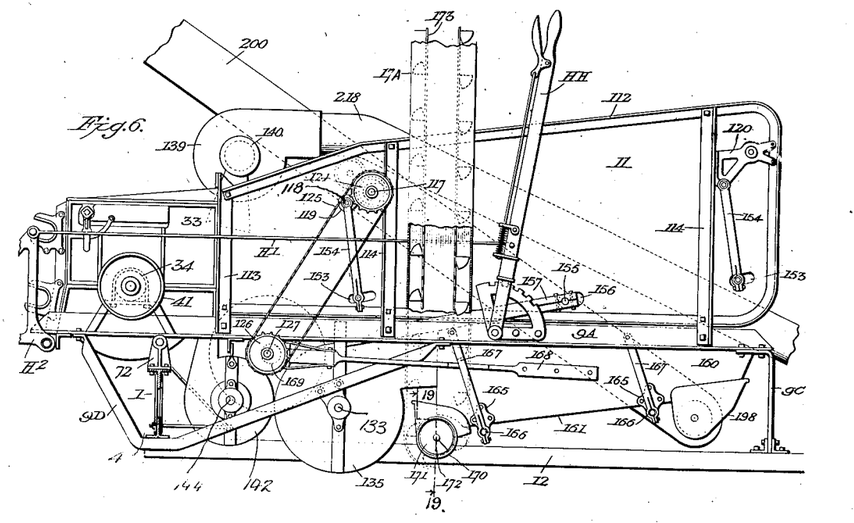
Fig. 6 is a side view of the thrashing and separating unit of the machine looking at the opposite side to that shown in Figure 2.
Figures 17, 18, 22, 23, 24:
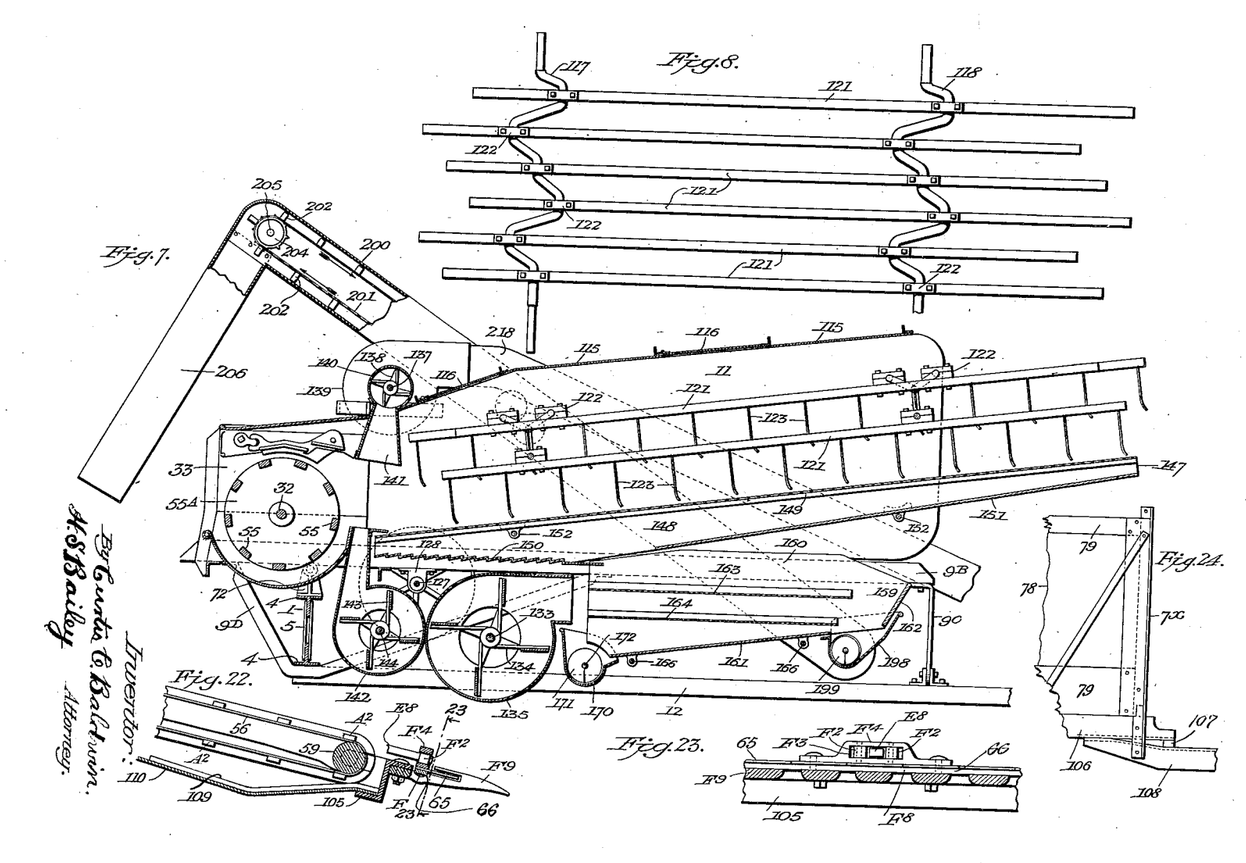
Fig. 22 is a fragmental transverse sectional view through the center portion of the table frame and substantially in a plane represented by line 22—22 in Fig. 1 of the drawings, showing the manner of supporting the outer end of the frame of the center conveyor which carries the wheat heads into the thrasher.
Fig. 23 is a front view, partly in section, of the portion of the table frame shown in Figure 22 and substantially in a plane represented by line 23—23 in said Fig. 22.
Fig. 24 is a rear view of a portion of the grain conveying platform.

The straw box 11 extends rearward from the thrashing cylinder and comprises side frames made of angle bars 112 bent to the shape shown clearly in Figure 6 and bolted at their forward ends to uprights 113 on the adjoining end of the housing 33. The side frames 112 are covered with thin sheet iron and are bolted to uprights 114, which are bolted at their lower ends to the parallel, horizontal angle bars 9ᴬ and 9ᴮ.

The side frames are connected by a sheet metal top or roofing 115 and by hinged doors 116 by which access can be had to the interior of the straw box for any purpose; the rear end of the box being open.

Near the front and rear ends of the straw box 11, and near the roof of the same, are mounted crank shafts 117 and 118, the ends of which extend through the sides of the box and are mounted in bearing brackets 119 and 120. Each of these shafts is formed with six cranks, and to the corresponding cranks on each shaft are connected rake bars 121 having bearings 122 in which are pivotally mounted the crank portions of the said shafts. Each of the rake bars is provided with a plurality of rake teeth 123. The crank shaft 117 has a sprocket wheel 124 on one end, which sprocket wheel is connected by a chain 125 with a sprocket wheel 126 on a shaft 127 which is mounted in bearings 128 on the under side of the angle bars 9ᴬ and 9ᴮ. The opposite end of the shaft 127 carries a band pulley 129 which is operated in the following manner: One end of the shaft 32 of the thrashing cylinder carries a pulley 41, as previously mentioned, which is connected by a belt with the driving pulley of the tractor. The other end of the shaft 32 carries a pulley 130 around which passes a belt 131 which also passes over the pulley 129 and thence around a pulley 132 on the shaft 133 of a blower fan 134 in a housing 135 which is secured below the frame 9 to the angle bars 9ᴬ and 9ᴮ thereof and to the member 9ᴰ, as shown in Figure 6. From the pulley 132 the belt passes up over a pulley 136 on the shaft 137 of an exhaust fan 138 in a housing 139 having connected thereto an exhaust pipe 140 which extends across the top of the straw box 11, and on the outside thereof, and is provided with an inverted hopper-like intake 141 which extends through the top of the straw box and into the interior therof and is positioned directly above the mouth of a blower fan casing 142 having a fan 143 on a shaft 144. From the pulley 136 of the exhaust fan 138 the belt passes under an idle pulley 145 which acts as a belt tightener and thence to the pulley 130 on the shaft 32. The idle pulley 145 is mounted in a stirrup 146 which is mounted on the bolt 71 of the adjacent bracket 72 in which the table supporting bar 69 is pivotally mounted.

The blower fan 143 is rotated by a chain 43ᴬ, which connects a sprocket wheel 43ᴮ on the shaft 144 with a sprocket wheel 43ᶜ on the shaft 133 of the blower fan 134 which is operated by the belt 131, as above described—see Figure 15.

The rear crank shaft 118 is on a higher plane than the forward crank shaft 117 and the rake bars are thus held in inclined positions as the shafts rotate.

Below the rakes is suspended a straw shaker 147, which comprises side boards 148 the upper edges of which are connected by a coarse screen 149 which has the same inclination as the rakes, and a bottom which is spaced from the screen and which is made up of a horizontal corrugated sheet metal plate 150, which extends approximately a third of the length of the shaker, and a sheet metal plate 151 which begins a short distance from the termination of the corrugated plate 150 and extends to the rear end of the shaker, the plate 151 being at a greater inclination than the screen 149. The corrugations in the plate 150 have a sawtooth form in cross section, the teeth being pitched toward the rear, as clearly shown in Figure 7, for a purpose to be hereinafter set forth.

The straw shaker is provided with transverse rods 152, the ends of which extend out through openings 153 in the sides of the straw box and are pivotally mounted in the lower ends of arms 154, the upper ends of which are pivotally connected to the bearing brackets 119 and 120 on the sides of the straw box. One side board of the straw shaker is provided with a pin 155 which projects through an opening 156 in the adjacent side of the straw box and this pin is pivotally attached to one end of a pitman 157, the other end of which surrounds an eccentric 158 on the adjacent end of the shaft 127, by means of which short, quick reciprocations are imparted to the straw shaker for a purpose to be hereinafter explained.

Figure 20:
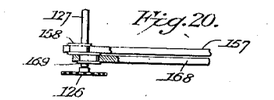
Fig. 20 is a fragmental plan view showing the double cecentric, and pitmen operated thereby, by which short, quick, reciprocations are imparted to the straw shaker and riddle box.

The space between the corrugated plate 150 and the inclined plate 151 of the straw shaker leaves an opening in the bottom of the shaker through which the grain falls into a riddle box 159, comprising side boards 160, a bottom 161 which inclines upward from its forward end to within a short distance of its rear end which is closed by an end board 162, and upper and lower sieves or riddles 163 and 164, respectively, the upper riddle being of coarser mesh than the lower riddle 164 and extending a short distance beyond the rear end of the said lower riddle. Upon the sides of the riddle box are secured brackets 165 which support shafts 166, the ends of which are pivotally mounted in the lower ends of hanger arms 167, the upper ends of which are pivotally secured to the angle bars 9$^A$ and 9$^B$. The riddle box is given short, quick, reciprocations by means of a pitman 168 which is secured at one end to one side of the riddle box, its opposite end surrounding an eccentric 169 on the shaft 127 which eccentric forms an integral part of the eccentric 158, as shown in Figures 6 and 20.

The forward end of the riddle box is open and the grain passing through both riddles falls on the inclined bottom 161 whence it slides into a trough or casing 170 which is positioned below the forward end of the riddle box. This trough extends the full width of the riddle box and in it is mounted an auger or screw conveyor 171, the shaft 172 of which is journaled at one end in the end of the trough 170 and its other end extends through the lower end of a vertical elevator housing 17$^A$ in which the adjacent end of the trough extends. Thus the auger 171 conveys the grain to the elevator 17$^A$ from which it is carried up the elevator and discharged from the upper end thereof by an endless bucket chain 173 which is mounted at its lower end on a sprocket wheel 174 on the auger shaft and at its upper end on a sprocket wheel 175 on a shaft 176 which is mounted in the sides of the elevator. The bucket chain 173 is operated by a sprocket chain 177 which passes around a sprocket wheel 178 on the upper elevator shaft 176 and also around a sprocket wheel 179 on the adjacent end of the forward crank shaft 117. This end of the crank shaft also carries the sprocket wheel 124 which is connected by the chain 125 to the sprocket wheel 126 on the shaft 127 which is driven in the manner previously described.

From the upper end of the elevator the grain is discharged into an enclosed inclined chute 183 which conveys it into a rotatable, cylindrical screen 184 which is enclosed in a housing 185 which is secured in any suitable manner to the upper end portion of the elevator 172, preferably to a board 186 which is secured to the said elevator.

This rotating screen is of a mesh which permits anything finer than wheat, such as seeds of various kinds and small particles of foreign matter, to pass through it; and this fine material passes out through a spout 187 leading from the bottom of the casing 185 and through a flexible tube or pipe 188 to a receptacle—not shown—which may be supported at a convenient point on the frame of the machine.

The screen 184 is secured to a band portion 85$^A$ on a sprocket wheel 85$^B$ which has an annular lip 85$^C$ which fits in an annular groove in a divided circular plate 85$^D$ which is secured to the board 186. The screen is thus supported at one end by the sprocket wheel which is free to turn in the groove of the divided plate. A sprocket wheel 85$^E$ is mounted on the end of the shaft 176 in line with the sprocket wheel 85$^B$ and these wheels are connected by a sprocket chain 85$^F$ whereby rotation is imparted to the screen 184.

The clean wheat, or other grain, which does not pass through the rotatable screen is discharged from the end thereof into a spout 189 at the end of the casing 185 whence it falls into an upwardly inclined pipe 190 in which is mounted an auger or screw conveyor 191, the shaft of which extends through that end of the pipe into which the spout 189 discharges and is connected by a knuckle or universal joint 192 with a shaft 193, the opposite end of which is mounted in an arm 194 which is adjustably secured to one side of the elevator 17ᴬ, as clearly shown in Figures 2 and 3.

The free end of the shaft 193 carries a sprocket wheel 195 which is engaged by the chain 177, whereby rotation is imparted to the screw conveyor 191; the adjustably mounted sprocket wheel 195 also acting as a tightener for the chain 177, as will be understood by reference to Figure 2. The screw conveyor 191 carries the grain through the pipe 190 and discharges it into a hopper 196 on the upper end of a spout or pipe 197, whence it discharges into a wagon—not shown—which is preferably attached to the outer end of the transverse pipe 16 which is secured to the frame of the tractor, as previously described. The product which does not pass through the upper and lower screens of the riddle box discharges from the rear ends of these screens and falls into a transversely arranged trough or casing 198 in which is mounted an auger or screw conveyor 199 which conveys the grain in an opposite direction to that which falls in the trough 170 at the opposite end of the riddle box and discharges it into the lower end of an upwardly inclined elevator 200 having an endless chain 201 to which are secured scrapers 202. This chain is mounted at its lower end on a sprocket wheel 203 on the adjacent end of the shaft of the screw conveyor 199; and at its upper end on a sprocket wheel 204 on a shaft 205 which is mounted in the sides of the elevator. From the upper end of this elevator a pipe or spout 206 extends downward and to one side in position to discharge the material passing through it onto the endless conveyor 92 whence it is discharged upon the wheat passing into the thrashing cylinder and is thus carried through the machine a second time.

The shaft 205 at the upper end of the elevator 200 carries a sprocket wheel 207 on its outer end which is connected by a chain 208 with a sprocket wheel 209 on a shaft 210, which extends through the elevator 200, and is mounted in the sides thereof. The inner end of the shaft 210 carries a gear wheel 211 which meshes with a gear wheel 212 on the adjacent end of the crank shaft 117, and thus motion is transmitted from the said crank shaft to the endless chain 201.

The stub axles 1ᴰ on the ends of the main axle 1 are provided with downwardly projecting spindles which are journaled in the bearings 1ᶜ on the ends of the said main axle and extend beyond the lower ends of said bearings, and to these extended ends of the said spindles are rigidly secured forwardly projecting arms 213 which are connected by a bar 214. A bell crank 215 is pivotally connected at one corner to a suitable bracket 216 and at a second corner to the said bar 214. The remaining corner of the bell crank is connected to a pull rod 217 which is connected with the steering mechanism of the tractor in the usual manner. The steering mechanism is not illustrated as it is such as is common in trucks and automobiles and therefore forms no part of the present invention.

The bell crank is operated by the pull rod 217 and the bar 214 through its connection with the arms 213 swings the stub shafts 1ᴰ, and their wheels 7, in either direction, thereby determining the course of the machine.

In operation the table 60 is raised to the required distance above the ground and the machine is started. The wheat, as it is cut by the sickle, drops on the endless conveyors 61 and 62 and is carried thereby to the inclined conveyor 56, which, with the cooperation of the conveyor 92, carries it into the thrashing cylinder where it is caught by the revolving blades or beaters 54 and drawn between the blades 55 of the concave plate 52 and forcibly thrown into the entrance of the straw box 11. At the entrance to the straw box it is subjected to an upward blast of air from the blower fan 143, by which the light material or chaff is separated from the straw loose grain, and is carried into the receiving hopper 141 of the exhaust pipe 140 whence it is drawn out by the exhaust fan 138 in the casing 139, and discharged through a spout 218, which is secured to the outlet nozzle of the casing. The straw and grain which are too heavy to be affected by the air blast fall upon the screen 149 of the straw shaker and the straw is caught by the rakes 121 and carried continuously rearward over the said screen until it is discharged from the rear end of the shaker, which is given a continuous quick-action reciprocating motion by the pitman 157.

The straw is so thoroughly shaken by the rakes that the grain is separated from the straw and falls upon the corrugated bottom member 150 and also upon the downwardly inclined bottom member 151. The grain which falls upon the latter member slides down and discharges onto the upper screen 163 of the riddle box; and the grain which falls upon the corrugated bottom 150 is thrown rearward by the stepped surface of said bottom, due to the reciprocating movement of the shaker, until it is also discharged upon the screen 163. This screen is coarser than the lower screen 164 and permits the wheat and grains of a like size to pass through it to the bottom screen and whatever is too large to pass through is discharged over the rear end thereof and drops into the screw conveyor casing 198. The lower screen 164 eliminates everything but the wheat grains and those of a like size; the larger material also discharging into the said casing 198, and this product or tailings, is carried by the auger 199 into the elevator 200 whence it is deposited upon the conveyor 92, which drops it on the wheat which is passing into the thrasher, and is thus carried through the machine again, as previously described.

The product passing into the trough 170 is conveyed thence into the elevator 172 and through the rotating screen 184 where everything of a smaller size than the wheat grains is separated from the wheat, and the wheat, after leaving the rotating screen, is carried through the pipes 190 and 197 to a suitable receptacle.

Having described my invention, what I claim as new and desire to secure by Letters Patent, is:

1. In a power-driven harvester and thrashing machine, a power mechanism carrying frame having traction wheels supporting one end of the frame and having an axle and wheels for supporting the other end of the frame, a thrashing mechanism carrying frame supported upon said power mechanism carrying frame, and means detachably connecting said thrashing mechanism carrying frame to said power mechanism carrying frame.

2. In a power-driven harvester and thrashing machine, a power mechanism carrying frame having traction wheels supporting one end of the frame and having an axle and wheels for supporting the other end of the frame, a thrashing mechanism carrying frame supported upon said power mechanism carrying frame, said axle being common to both frames, and means detachably connecting said thrashing mechanism carrying frame to said power mechanism carrying frame.

3. In a power-driven harvester and thrashing machine, a chassis comprising an axle, wheels on said axle, traction wheels supporting an end of said chassis, power mechanism supported by a part of said chassis, a thrashing mechanism carrying frame supported upon another part of said chassis and means for removably securing said thrashing mechanism carrying frame to said chassis.

4. In a power-driven harvesting and thrashing machine, the combination with a chassis comprising an axle, wheels thereon and a thrashing mechanism carrying frame, of a second axle having a power mechanism carrying frame and traction wheels thereon and means for connecting said power mechanism carrying frame to said chassis axle and said thrashing mechanism supporting frame.

5. In a power-driven harvesting and thrashing machine, the combination with a chassis comprising a front axle and wheels and a rearwardly extending frame on which is mounted a thrashing mechanism, of a rear axle having wheels, a forwardly extending power mechanism carrying frame supported thereon and means for connecting the front of said power mechanism carrying frame to the chassis axle and its end portion to the thrashing mechanism supporting frame.

6. In a power-driven harvesting and thrashing machine, a chassis comprising a front axle and wheels, a rearwardly extending frame on which is mounted the thrashing mechanism and a rear supporting bar connected to said frame, and a tractor having a body frame supported on an axle and wheels and provided with means for connecting the end of said tractor body frame to said chassis axle and rear supporting bar respectively.

7. In a power-driven harvesting and thrashing machine, the combination with a chassis comprising an axle and wheels thereon and a thrashing mechanism carrying frame, of a power mechanism carrying frame, traction wheels supporting said power mechanism carrying frame, means for detachably connecting the said power mechanism carrying frame to said chassis at the rear end thereof, and means including pivoting members for detachably securing the front end of said power mechanism carrying frame to said chassis axle.

8. In a power-driven harvesting and thrashing machine, the combination with a chassis comprising an axle and wheels thereon and a frame, of thrashing mechanism carried by said frame, a second axle having wheels and a frame thereon, power mechanism carried by said second frame, means for removably connecting said frames and means for operating said thrashing mechanism from said power mechanism.

9. In a power-driven harvesting and thrashing machine, the combination with a chassis comprising an axle, wheels and a frame, of thrashing mechanism carried by said frame, a second axle having a tractor frame and traction wheels thereon, power mechanism on said tractor frame, means for connecting said power mechanism to said tractor wheels and means independent of said first mentioned means for connecting said power mechanism to said thrashing mechanism.

10. In a power-driven harvesting and thrashing machine, the combination with a chassis comprising an axle, wheels thereon and a thrashing mechanism carrying frame, of a tractor frame mounted on a pair of traction wheels, means for connecting the rear end of said tractor frame to said chassis and means including a universal joint for connecting the front end of the tractor frame to said chassis axle.

11. In a power-driven harvesting and thrashing machine, the combination with a chassis comprising an axle, wheels thereon and a thrashing mechanism carrying frame, of a tractor frame mounted on a pair of traction wheels, means for connecting the rear end of said tractor frame to said chassis and means including a bolt pivotally mounted on said chassis axle and a pin pivotally carried by said bolt for connecting the front end of said tractor frame to said chassis axle.

12. In a power-driven harvesting and thrashing machine, the combination with a chassis comprising an axle, wheels thereon, a thrashing mechanism carrying frame and a rear supporting bar connected to said frame, of a tractor frame mounted on a pair of traction wheels, means including a universal joint for connecting the front of the tractor frame to said axle, means for connecting the rear of said tractor frame to said rear supporting bar and bracing members carried by said tractor frame and connected to said rear supporting bar and to said axle.

13. In a machine of the character described, the combination with a supporting frame having a wheeled axle on its forward end, thrashing mechanism on said frame, a tractor; of a bracket on said axle, a pin mounted in said bracket having a bifurcated head, a depending member on the forward end of said tractor which extends into said bifurcated head, a bolt which passes through said depending member and said bifurcated head, a plate secured to said bracket, a frame on said tractor, rods connected at one end to said frame and having a hooked connection with said plate at their opposite ends, and braces connecting said tractor frame with the outer portions of said axle, the connection of said tractor with said axle permitting a rocking movement of the tractor along its longitudinal axis.

14. In a power-driven harvesting and thrashing machine, the combination with a chassis comprising an axle, wheels thereon and a frame, of thrashing mechanism carried by said frame, a platform supported by said axle, means for conveying grain from said platform to said thrashing mechanism, a tractor having a frame mounted on a pair of traction wheels and means for connecting the ends of said tractor frame to said chassis axle and said thrashing mechanism carrying frame respectively.

15. The combination with a tractor propelled frame having a wheeled axle on its forward end, and thrashing mechanism on said frame, of a grain cutting and conveying platform, cross arms extending beneath and secured to said platform, their free ends being hinged to said axle, manually operated means for raising or lowering said cross arms to vary the position of the platform with respect to the ground and conveyors connecting said thrashing mechanism and said platform and movable with the latter.

16. The combination with a tractor-propelled frame having a wheeled axle on its front end, of trussed cross arms, one of which passes through the other, the rear ends of said arms being hinged to said axle, and being connected by a bolt at the point where they cross, a grain cutting and conveying platform secured upon the outer ends of said arms, lever mechanism for raising or lowering said arms, and tension devices for exerting a continuous upward pull on said arms.

17. In a tractor-propelled harvesting and thrashing machine, the combination with a supporting frame having an axle on its front end, wheels on said axle, and means for steering said wheels, of arms hinged at their rear ends to said axle, a platform secured upon the outer ends of said arms, having a cutter bar, means for raising or lowering said arms, thrashing mechanism on said supporting frame, a conveyor intermediate the length of said platform and arranged to deliver cut grain to said thrashing mechanism, and oppositely moving conveyors on said platform for delivering cut grain to said intermediate conveyor.

18. In a combined grain cutting, thrashing and tractor operated and propelled harvester, having a platform, a reel, a supporting frame and an axle, the combination with the platform and axle of a trussed frame secured at one end to said platform and hinged at the opposite end to said axle, lever mechanism on said supporting frame for raising or lowering said trussed frame, standards on said axle and adjustable tension springs connecting said platform and standards.

19. In a tractor-operated harvesting and thrashing machine of the character described, the combination with a supporting frame having an axle, and a platform, of trussed arms extending under and secured at their outer ends to said platform, their inner ends being hinged to said axle, a shaft mounted in said frame, lever arms rigidly secured to said shaft and rods connecting said lever arms with said trussed arms, one of said lever arms being in the form of a bell crank; a hand lever pivotally secured on said supporting frame, a rod connecting the hand lever and bell crank, whereby the trussed arms may be raised or lowered; standards on said axle, and tension coil springs connecting said standards and said platform.

20. In a tractor-operated harvesting and thrashing machine of the character described, the combination with a platform and a supporting frame having an axle at the forward end thereof, of crossed, trussed arms, the inner ends of which are hinged to said axle, their outer ends extending beneath and being secured to said platform, a bolt extending through said trussed arms at the point where they cross, and braces connecting the inner end of one trussed arm, with the outer portion of the other arm, said arms forming a trussed frame, a shaft mounted in said supporting frame forward of said axle having rigid lever arms on its ends, rods connecting the lever arms with the trussed frame, one of the lever arms being in the form of a bell crank, a hand lever pivoted to the supporting frame, and a rod connecting the same with the said bell crank, standards on the axle, pairs of contraction coil springs connecting each standard with the adjacent bottom edge of said platform, and means for varying the tension of said springs.

21. In a combined grain cutting, thrashing and tractor operated and propelled harvester, having a platform, a reel, a chassis and an axle, the combination with a trussed frame pivotally secured at one end to said axle and extending under and secured to said platform, and standards on the axle, of two pairs of tension springs secured to the rear side edge of said platform at one end, and adjustably secured at their opposite ends to said standards arranged to hold said springs at an angle at which they support said platform in an operative grain receiving position.

22. In a combined grain cutting, thrashing and tractor operated and propelled harvester, having a platform, a reel, a chassis and an axle, the combination with the axle of two vertical standards secured to said axle, an elongated plate secured to the top of said standards, two threaded rods extending loosely through each of said plates and having an eyed end at the upper ends bearing on the tops of said plates, a pair of coiled springs into which said threaded rods extend a portion of their lengths, a plug threaded onto each of said threaded rods and provided with a wrench receiving hub and arranged to be threaded into the coils of said springs, a plug secured in the opposite ends of each pair of springs, a short rod threaded into each plug at one end and provided with a hook at its opposite end, and a pair of plates secured to the rear side edge of said platform provided with apertures to which the hooked ends of said threaded rods are secured.

23. In a power-driven harvester and thrashing machine, a power mechanism carrying frame having traction wheels supporting one end of the frame and having an axle and wheels for supporting the other end of the frame, a thrashing mechanism carrying frame being attached to said power mechanism carrying frame substantially midway of said thrashing mechanism carrying frame whereby the latter is in substantially balanced position, and means detachably connecting said thrashing mechanism carrying frame to said power mechanism carrying frame.

24. In a power-driven harvester and thrashing machine, a power mechanism carrying frame having traction wheels supporting one end of the frame and having an axle and wheels for supporting the other end of the frame, a thrashing mechanism carrying frame being attached substantially midway thereof to said axle whereby the harvesting and thrashing mechanisms are supported in substantially balanced position on said axle, and means detachably connecting said thrashing mechanism carrying frame to said power mechanism carrying frame.

25. In a power-driven harvester and thrashing machine, a chassis comprising an axle, wheels on said axle, tractor wheels supporting an end of said chassis, power mechanism supported by a part of said chassis, a thrashing mechanism carrying frame supported upon another part of said chassis, and means for detachably securing said thrashing mechanism carrying frame to said axle.

26. In a power-driven harvester and thrashing machine, a chassis comprising an axle, wheels on said axle, tractor wheels supporting an end of said chassis, power mechanism supported by a part of said chassis, a thrashing mechanism carrying frame supported upon another part of said chassis, means for removably securing said thrashing mechanism carrying frame to said chassis, and brace members connected to said frame and chassis.

In testimony whereof I affix my signature.

CURTIS C. BALDWIN.